July 12, 1966  W. B. HOGEMAN  3,260,743
PROCESS FOR RECOVERY OF ADIPIC ACID PRECURSORS
Filed Sept. 18, 1962
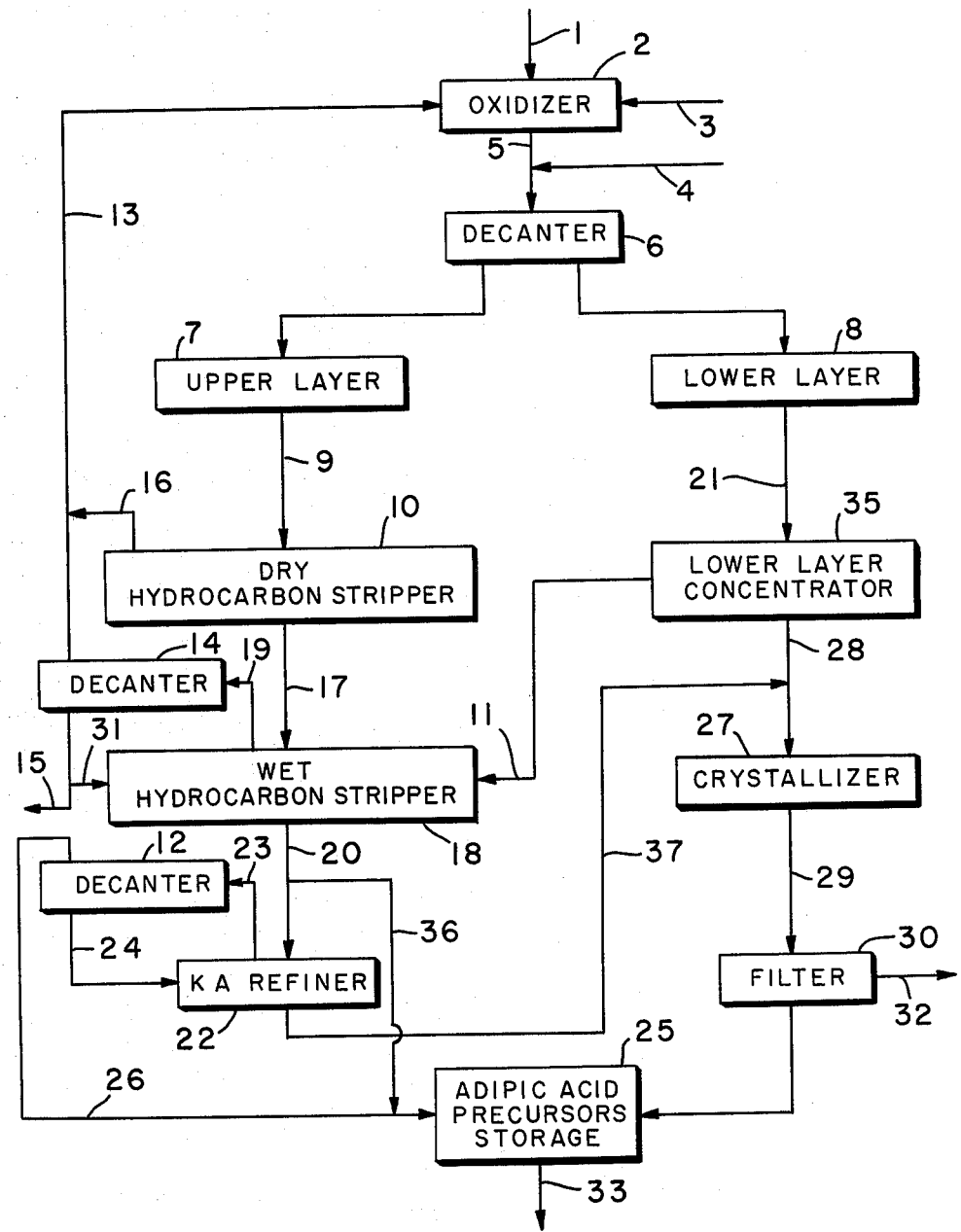
INVENTOR.
WYLIE B. HOGEMAN
BY
ATTORNEY

United States Patent Office 3,260,743
Patented July 12, 1966

1

3,260,743
PROCESS FOR RECOVERY OF ADIPIC ACID
PRECURSORS
Wylie B. Hogeman, Pensacola, Fla., assignor to Monsanto Company, St. Louis, Mo., a corporation of Delaware
Filed Sept. 18, 1962, Ser. No. 224,443
4 Claims. (Cl. 260—533)

This invention relates to improvements in the oxidation of cyclohexane to adipic acid and more particularly is directed to the process which involves the oxidation of cyclohexane with molecular oxygen to primary oxidation products followed by oxidation of these primary products to adipic acid by nitric acid or other means.

In the aforesaid process, according to prior art, the cyclohexane is oxidized with air to cyclohexanol, cyclohexanone, peroxides and various other oxidized products; the unoxidized cyclohexane is recovered from these primary oxidation products; and the cyclohexane free oxidation product is further oxidized to adipic acid with the nitric acid. In this manner the cyclohexanol and cyclohexanone are not isolated, and the ultimate yield of adipic acid is high because attending miscellaneous adipic acid precursors are converted to adipic acid in the nitric acid oxidation step.

This described process is not free from difficulty however. The quality of the adipic acid obtained is not the best and the nitric acid oxidation step is not as efficient as it could be because of the various primary oxidation products which are present in the nitric acid oxidation feed. Some of these products give rise to the formation of glutaric and succinic acids, both of which must be removed in the adipic acid recrystallizer thereby increasing the overall cost of the process markedly.

A number of methods have been devised for treating the cyclohexane oxidation product to prepare a nitric acid oxidation feed which is selective to adipic acid precursors, however, all the methods thus far are either too expensive for the increased yield of adipic acid obtained or cause the loss of adipic acid precursors in waste streams or in process streams by esterification or other actions.

An example of such a process is one which has much commercial favor. In this process, the reaction product which results from the air oxidation of cyclohexane is mixed with water and this aqueous mixture is stripped of unoxidized cyclohexane which is returned to the air oxidizing units. The tails from the cyclohexane or hydrocarbon stripping are refined further by distillation, crystalization and filtration to prepare a feed stream for the nitric acid oxidizers which is extremely rich in adipic acid precursors. It has been found, however, that unaccountable losses of adipic acid precursors occur in the operation of this process.

An object of this invention is therefore to provide an improved method for processing the reaction product from the oxidation of cyclohexane to produce economically a nitric acid oxidizer feed containing a maximum amount of adipic acid precursors.

Another object of this invention is to provide an improved method for processing the reaction product from the oxidation of cyclohexane to prepare a nitric acid oxidizer feed which prevents losses of adipic acid precursors in the said processing.

2

A further object of this invention is to provide an improved method for processing the reaction product from the oxidation of cyclohexane to prepare a feed for the nitric acid oxidation step which contains a minimum of succinic and glutaric acids or the precursors therefor.

Other objects and advantages of the invention will appear from the following description.

It has been found that surprisingly better yields of adipic acid can be obtained from the oxidation of cyclohexane by the process of this invention than can be obtained by heretofore known processes. Generally, the process involves air oxidation of cyclohexane, addition of water to the oxidation product, and then substantially separate treatment of the oil and aqueous layers of the air oxidation product formed to obtain adipic acid precursors for subsequent oxidation by nitric acid or other means. In distinction over other prior processes, this process provides a better utilization of necessary equipment and permits the production of increased amounts of adipic acid by more efficient utilization of the available adipic acid precursors by preventing their loss during processing. Also, because of lower heat loading, larger volumes of material can be processed through equipment of a given size.

The objects of this invention are accomplished by a process which will be more readily understood by reference to the accompanying flow diagram, FIGURE 1, which shows the oxidation of cyclohexane followed by separation of various reaction products for subsequent oxidation to adipic acid by means of nitric acid. FIGURE 1 illustrates the liquid phase air oxidation of cyclohexane by a process in which the cyclohexane is pumped at 1 from the cyclohexane storage (not shown) to the oxidizer 2 with air entering the oxidizer 2 at 3. As an example, a typical oxidizer may consist of three stirred autoclave oxidizers in series equipped with reflux condensers for water take-off and operation at a temperature of from 130° C. to 190° C. at superatmospheric pressures. Water is added at 4 to the oxidation reaction product leaving the oxidizer at 5 to prevent plugging of the lines with water soluble solid contained therein, and this aqueous mixture may or may not be cooled prior to its entry into decanter 6 where the oil layer and aqueous layer are permitted to separate with the oil layer being drawn off to upper layer storage 7 and the aqueous layer to lower layer storage 8.

The upper layer or oil layer, which is rich in cyclohexanone and cyclohexanol and contains the unoxidized cyclohexane and other water insoluble oxidation products, is transferred as shown by line 9 to a dry hydrocarbon stripper 10 which may be any standard rectification column such as a sieve tray or bubble cap tray column designed to remove a major portion of the unoxidized cyclohexane from the upper layer of the oxidation product. Unoxidized cyclohexane is removed from the column as shown by line 16 and returned to the oxidizing units as indicated by line 13. As a typical example, the dry hydrocarbon stripper 10 may be a thirty tray bubble cap column operated with a column top temperature of 60° C. to 100° C. and at atmospheric pressure. Vacuum or superatmospheric pressure may be used if desired.

Oxidation product from which a major portion of the unoxidized cyclohexane has been removed leaves the dry hydrocarbon stripper 10 and enters the wet hydrocarbon stripper 18 as shown by line 17. The wet hydrocarbon stripper 18 also may be any standard rectification column, such as a sieve tray or bubble cap column, designed to remove essentially all the remaining unoxidized cyclohexane from the upper layer of the oxidation product.

Water which enters the hydrocarbon stripper at 11 from the distillate of the lower layer concentrator 35 goes overhead also in wet hydrocarbon stripper 18. This overhead or make stream 19 may be cooled and is then permitted to separate into a cyclohexane layer and an aqueous layer in decanter 14 with the cyclohexane layer being returned to the oxidizer, as shown by line 13, and the aqueous layer being sent to waste, as shown by line 15. A portion of the waste water stream of line 15 may be returned to the wet hydrocarbon stripper 18 as reflux, if desired, as shown by line 31. The tails from the wet hydrocarbon stripper proceed, as shown by line 20, either to the KA refiner 22 where a final distillation purification step of the upper or oil layer may take place or, as shown by line 36, directly to the adipic acid precursor storage 25 or to both depending upon the desired degree of separation needed for the upper layer product.

A typical example of a wet hydrocarbon stripper 18 may be a thirty tray bubble cap column operated at a column top temperature of 60° C. to 100° C. and suitable pressure to effect the desired separation.

Tails from the wet hydrocarbon stripper, as shown by line 20, which contain cyclohexanone, cyclohexanol, and other water insoluble oxidation products may be fed to the KA refiner 22 which may be any standard rectification column of any type such as a sieve tray column or bubble cap tray column. In the KA refiner 22 the final distillation separation of the adipic acid precursors from that portion of the upper layer fed thereto takes place. After cooling, the make stream 23 from the KA refiner goes to decanter 12 where the aqueous layer and oil layer are permitted to separate with the aqueous layer being returned to the KA refiner as reflux, as shown by line 24. The oil layer from the decanter 12 is pumped to adipic acid precursor storage 25, as shown by line 26, and the tails from the KA refiner proceed to crystallizer 27, as shown by line 37. In a typical example the KA refiner may be a thirty tray bubble cap rectification column operated with a top temperature of 80° C. to 120° C. and a bottom temperature of 100° C. to 140° C. depending upon whether the pressure within the column is subatmospheric, atmospheric, or superatmospheric.

The aqueous lower layer 8 which contains adipic acid, water, water soluble esters, traces of cyclohexanone, and other water soluble non-volatile residue is fed to the lower layer concentrator 35, as shown by line 21, which may be a rectification column of any type such as a sieve tray column or bubble cap tray column. After cooling, the distillate stream 11 from the lower layer concentrator 35 goes to hydrocarbon stripper 18 where the valuable water soluble adipic acid precursors are recovered and added to the oil layer leaving the bottom of hydrocarbon stripper 18 at 20. The tails from the lower layer concentrator proceed to crystallizer 27, as shown by line 28. In a typical example the lower layer concentrator may be a thirty tray bubble cap rectification column operated with a top temperature of 80° C. to 120° C. and a bottom temperature of 100° C. to 140° C. depending upon whether the pressure within the column is subatmospheric, atmospheric, or superatmospheric.

The crystallizer 27 is operated to precipitate selectively adipic acid precursors from the material of line 28 and line 37 and may be of any type such as an agitated vacuum vessel. In a typical example of an agitated vacuum crystallizer the operating temperature may be 30° C. to 60° C. depending upon the operating pressure within the crystallizer.

As shown by line 29, the material leaving the crystallizer enters filter 30 where selectively precipitated adipic acid precursors formed in the crystallizer are removed from the remaining liquid. The filter cake which contains adipic acid, non-volatile residue which is insoluble in the remaining non-aqueous liquor at the operating conditions of the crystallizer, and small amounts of glutaric and succinic acids are transferred to the adipic acid precursor storage 25 as was the material from line 26. The adipic acid precursors in adipic acid precursor storage are then ready for subsequent treatment by nitric acid oxidation or other process as shown by line 33. The mother liquor leaving filter 30 at 32 may be used as fuel or may be sent to waste as desired.

As can be seen clearly from the above description of the flow of materials within the various streams of the process of this invention, the upper layer or oil layer and the lower layer or aqueous layer of the products of the air oxidation of cyclohexane are not permitted to come into contact with each other at any time when conditions of temperature and pressure may be conducive to interreaction of the products to the detriment of the adipic acid precursor yield. The increase in yield of adipic acid precursors which results from the separate treatment of the upper and lower layers was completely unexpected, and although the exact reactions which are thought to be prevented by the individual treatment of the layers are not known, it is postulated that esterification of adipic acid precursors in the oil layer with adipic acid precursors or water soluble non-volatile residue in the aqueous layer was taking place during either the stripping of the cyclohexane or the separation of the water and non-volatile residue from the adipic precursors or both. The possibility of unwanted reactions in these parts of the process are avoided by the process of this invention. Only the oil layer or upper layer and water removed from the aqueous or lower layer are subjected to the stripping of the unoxidized cyclohexane.

Further, increased adipic acid precursor yield is obtained by not permitting high boiling organic material rich in adipic precursors to be lost to waste. As can be seen clearly from FIGURE 1, high boiling organic material, which is in the oxidation product from the air oxidation step and is water insoluble, will be in the upper or oil layer 7 and may proceed through the stripping step to the adipic acid precursor storage 25 by the process of this invention. In previous processes this was not so in that the high boiling, water soluble, organic materials were processed in such a manner as to pass them through the crystallization and filtration steps where they were not recovered and were subsequently lost to waste in the mother liquor from the filter. Only the oil layer or upper layer and water removed from the aqueous or lower layer are subjected to the stripping of the unoxidized cyclohexane, and in the subsequent separations the conditions of temperature and pressure are such that essentially only the water vapor from the aqueous layer contacts the adipic acid precursors contained in the oil layer stream and only water insoluble non-volatile residue from the oil layer contacts the adipic acid precursors contained in the aqueous layer stream.

The improvement in the yield of adipic acid and adipic acid precursors which is obtained by the process of this invention is exemplied by the data in Table I below which shows a comparison of the adipic acid and adipic acid precursor yields as obtained from the old process which has much commercial favor and the new process of this invention. It is to be emphasized that the equipment of the processes, i.e., distillation columns, air oxidizing units and other component parts, are the same for both processes. Only the process utilization of the equipment is changed. The data shown under the heading "old" were obtained when the upper layer and lower layer, as shown in the figure at 7 and 8, were fed jointly in metered quantities to hydrocarbon strippers 10 and 18 of the figure in series and the tails from the stripping operation were fed to the KA refiner 22. The data shown under "new" were obtained when the process of this invention was used and 60 percent of the material leaving the tails of hydrocarbon stripper 18 was fed directly to adipic acid precursor storage 25, as shown by line 36 of FIGURE 1 and the remaining 40 percent of the hydrocarbon stripper tail stream 20 was fed to KA refiner 22. Obviously, this proportion is not critical and can be varied as desired to obtain increased productivity. All data were obtained from operation of a continuous process and have the same units which are pounds per unit of time based upon a constant flow rate from the units for the air oxidation of cyclohexane.

TABLE I.—ADIPIC ACID POTENTIAL OF CYCLOHEXANE OXIDATION REACTION PRODUCT

| Product Component | Before Processing | After Processing |
|---|---|---|
| 1. Adipic acid precursors: | | |
| a. Old process | 224.9 | 194.0 |
| b. New process | 224.9 | 207.6 |
| 2. Adipic acid: | | |
| a. Old process | 24.3 | 10.8 |
| b. New process | 24.3 | 15.8 |
| 3. Esters: | | |
| a. Old process | 18.3 | 4.7 |
| b. New process | 18.3 | 10.1 |
| 4. Valeric acid: | | |
| a. Old process | 17.2 | 3.4 |
| b. New process | 17.2 | 7.9 |

As can be seen from Table I above, the total adipic acid potential of the streams leaving the air oxidation units and entering the recovery processes of the new and novel method of this invention and the old method which had much commercial favor is the same; i.e., the sum of the adipic acid precursors and adipic acid available in the streams. In the process of this invention whereby only the oil layer is subjected to stripping and the water layer is treated separately in the lower layer concentrator there is an overall increase of approximately 9% in yield of adipic acid potential of the material to be fed to further oxidation steps, such as nitric acid oxidation, over that available when the oil and aqueous layers are fed jointly to the hydrocarbon stripper and the resulting product commingled in the refining operation. This increased yield is obtained, as is shown in Table I, without an increase in by-products otherwise detrimental to the process.

Another important advantage which is apparent from the preceding description is the reduction of heat required for the stripping of the cyclohexane and the increased vapor volume available in the hydrocarbon stripper columns, due to the absence of water therein. These advantages permit a sizeable increase in volume throughput for any given column size over that which was possible in previous processes and thereby permit important savings in processing costs and lower heat requirements.

As various modifications of the invention as described above will be apparent to those skilled in the art, it will be understood that the invention is not limited to the foregoing description thereof except as is defined in the appended claims.

What is claimed is:

1. In the manufacture of adipic acid by oxidizing cyclohexane in the liquid phase with molecular oxygen at a temperature between 130° C. and 190° C. and superatmospheric pressures to a cyclohexane oxidation product, comprising adipic acid precursors followed by oxidation of said adipic acid precursors to adipic acid by nitric acid oxidation, the process for the separation of the adipic acid precursors from said cyclohexane oxidation product which comprises, in combination, the steps of:

a. injecting water into the effluent from a liquid phase cyclohexane oxidation step;
b. decanting the resulting aqueous mixture into a first oil phase and a first aqueous phase;
c. subjecting said first aqueous phase to distillation conditions in a first distillation means operated at atmospheric pressure with a top temperature of 80° C. to 120° C. and a bottom temperature of 100° C. to 140° C. to obtain an aqueous distillate and an adipic-acid-rich precursor tail stream;
d. subjecting concurrently said first oil phase and said aqueous distillate to distillation conditions in a second distillation means operated at atmospheric pressure and a top temperature of 60° C. to 100° C. to remove substantially all unoxidized cyclohexane from the combined first oil phase and said aqueous distillate;
e. subjecting at least a part but not all of the resulting substantially cyclohexane-free first oil phase and aqueous distillate to distillation conditions in a third distillation means operated at atmospheric pressure and a top temperature of 80° C. to 120° C. and a bottom temperature of 100° C. to 140° C.;
f. combining any tail stream from said third distillation means with said adipic-acid-rich precursor tail stream from said first distillation means;
g. precipitating, at a temperature between 30° C. and 60° C. and a pressure less than atmospheric, adipic acid precursors from the resulting combined mixture of said any tail stream from said third distillation means and said adipic-acid-rich precursor tail stream;
h. decanting the distillate from said third distillation means into a second oil phase and a second aqueous phase;
i. combining:
  (1) the precipitated adipic acid precursors,
  (2) said second oil phase, and
  (3) that part of said resulting substantially cyclohexane-free first oil phase and aqueous distillate not subjected to distillation
to prepare an adipic acid precursor feed stock for subsequent nitric acid oxidation.

2. In the manufacture of adipic acid by oxidizing cyclohexane in the liquid phase with molecular oxygen at a temperature between 130° C. and 190° C. and superatmospheric pressures to a cyclohexane oxidation product comprising adipic acid precursors followed by oxidation of said adipic acid precursors to adipic acid by nitric acid oxidation, the process for the separation of the adipic acid precursors from said cyclohexane oxidation product which comprises, in combination, the steps of:

a. injecting water into the effluent from a liquid phase cyclohexane oxidation step;
b. decanting the resulting aqueous mixture into a first oil phase and a first aqueous phase;
c. subjecting said first aqueous phase to distillation conditions in a first distillation means operated at atmospheric pressure with a top temperature of 80° C. to 120° C. and a bottom temperature of 100° C. to 140° C. to obtain an aqueous distillate and an adipic-acid-rich precursor tail stream;
d. subjecting said first oil layer to cyclohexane stripping conditions in a second distillation means operated with a top temperature of 60° C. to 100° C. to remove cyclohexane contained therein;
e. subjecting concurrently the resulting bottom stream from said second distillation means and said aqueous distillate to distillation conditions in a third distillation means operated at atmospheric pressure and a top temperature of 60° C. to 100° C. to remove substantially all unoxidized cyclohexane from the combined first oil phase and said aqueous distillate;
f. subjecting at least a part but not all of the resulting substantially cyclohexane-free first oil phase and aqueous distillate to distillation conditions in a fourth distillation means operated at atmospheric pressure and a top temperature of 80° C. to 120° C. and a bottom temperature of 100° C. to 140° C.;
g. combining any tail stream from said fourth distillation means with said adipic-acid-rich precursor tail stream from said first distillation means;
h. precipitating, at a temperature between 30° C. and 60° C. and a pressure less than atmospheric, adipic acid precursors from the resulting combined mixture of any tail stream from said fourth distillation means and said adipic-acid-rich precursor tail stream;
i. decanting the distillate from said fourth distillation means into a second oil phase and a second aqueous phase;
j. combining:
   (1) the precipitated adipic acid precursors,
   (2) said second oil phase, and
   (3) that part of said resulting substantially cyclohexane-free first oil phase and aqueous distillate not subjected to distillation
to prepare an adipic acid precursor feed stock for subsequent nitric acid oxidation.

3. In the manufacture of adipic acid by oxidizing cyclohexane in the liquid phase with molecular oxygen at a temperature between 130° C. and 190° C. and superatmospheric pressures to a cyclohexane oxidation product comprising adipic acid precursors followed by oxidation of said adipic acid precursors to adipic acid by nitric acid oxidation, the process for the separation of the adipic acid precursors from said cyclohexane oxidation product which comprises, in combination, the steps of:
a. injecting water into the effluent from a liquid phase cyclohexane oxidation step;
b. decanting the resulting aqueous mixture into a first oil phase and a first aqueous phase;
c. subjecting said first aqueous phase to distillation conditions in a first distillation means operated at atmospheric pressure with a top temperature of 80° C. to 120° C. and a bottom temperature of 100° C. to 140° C. to obtain an aqueous distillate and an adipic-acid-rich precursor tail stream;
d. subjecting concurrently said first oil phase and said aqueous distillate to distillation conditions in a second distillation means operated at atmospheric pressure and a top temperature of 60° C. to 100° C. to remove substantially all unoxidized cyclohexane from the combined first oil phase and said aqueous distillate;
e. subjecting from 20 percent to 60 percent of the resulting substantially cyclohexane-free first oil phase and aqueous distillate to distillation conditions in a third distillation means operated at atmospheric pressure and a top temperature of 80° C. to 120° C. and a bottom temperature of 100° C. to 140° C.;
f. combining any tail stream from said third distillation means with said adipic-acid-rich precursor tail stream from said first distillation means;
g. precipitating, at a temperature between 30° C. and 60° C. and a pressure less than atmospheric, adipic acid precursors from the resulting combined mixture of said any tail stream from said third distillation means and said adipic-acid-rich precursor tail stream;
h. decanting the distillate from said third distillation means into a second oil phase and a second aqueous phase;
i. combining:
   (1) the precipitated adipic acid precursors,
   (2) said second oil phase, and
   (3) that part of said resulting substantially cyclohexane-free first oil phase and aqueous distillate not subjected to distillation
to prepare an adipic acid precursor feed stock for subsequent nitric acid oxidation.

4. In the manufacture of adipic acid by oxidizing cyclohexane in the liquid phase with molecular oxygen at a temperature between 130° C. and 190° C. and superatmospheric pressures to a cyclohexane oxidation product comprising adipic acid precursors followed by oxidation of said adipic acid precursors to adipic acid by nitric acid oxidation, the process for the separation of the adipic acid precursors from said cyclohexane oxidation product which comprises, in combination, the steps of:
a. injecting water into the effluent from a liquid phase cyclohexane oxidation step;
b. decanting the resulting aqueous mixture into a first oil phase and a first aqueous phase;
c. subjecting said first aqueous phase to distillation conditions in a first distillation means operated at atmospheric pressure with a top temperature of 80° C. to 120° C. and a bottom temperature of 100° C. to 140° C. to obtain an aqueous distillate and an adipic-acid-rich precursor tail stream;
d. subjecting said first oil layer to cyclohexane stripping conditions in a second distillation means operated with a top temperature of 60° C. to 100° C. to remove unoxidized cyclohexane contained therein;
e. subjecting concurrently the resulting bottom stream from said second distillation means and said aqueous distillate to distillation conditions in a third distillation means operated at atmospheric pressure and a top temperature of 60° C. to 100° C. to remove substantially all unoxidized cyclohexane from the combined first oil phase and said aqueous distillate;
f. subjecting from 20 percent to 60 percent of the resulting substantially cyclohexane-free first oil phase and aqueous distillate to distillation conditions in a fourth distillation means operated at atmospheric pressure and a top temperature of 80° C. to 120° C. and a bottom temperature of 100° C. to 140° C.;
g. combining any tail stream from said fourth distillation means with said adipic-acid-rich precursor tail stream from said first distillation means;
h. precipitating, at a temperature between 30° C. and 60° C. and a pressure less than atmospheric, adipic acid precursors from the resulting combined mixture of said any tail stream from said fourth distillation means and said adipic-acid-rich precursor tail stream;
i. decanting the distillate from said fourth distillation means into a second oil phase and a second aqueous phase;
j. combining:
   (1) the precipitated adipic acid precursors,
   (2) said second oil phase, and
   (3) that part of said resulting substantially cyclohexane-free first oil phase and aqueous distillate not subjected to distillation
to prepare an adipic acid precursor feed stock for subsequent nitric acid oxidation

References Cited by the Examiner

UNITED STATES PATENTS 2,703,331   3/1955   Goldbeck et al. _____ 260—531

FOREIGN PATENTS 1,266,886   6/1961   France.

LORRAINE A. WEINBERGER, *Primary Examiner.*

LEON ZITVER, *Primary Examiner.*

I. R. PELLMAN, S. B. WILLIAMS, *Assistant Examiners.*